UNITED STATES PATENT OFFICE.

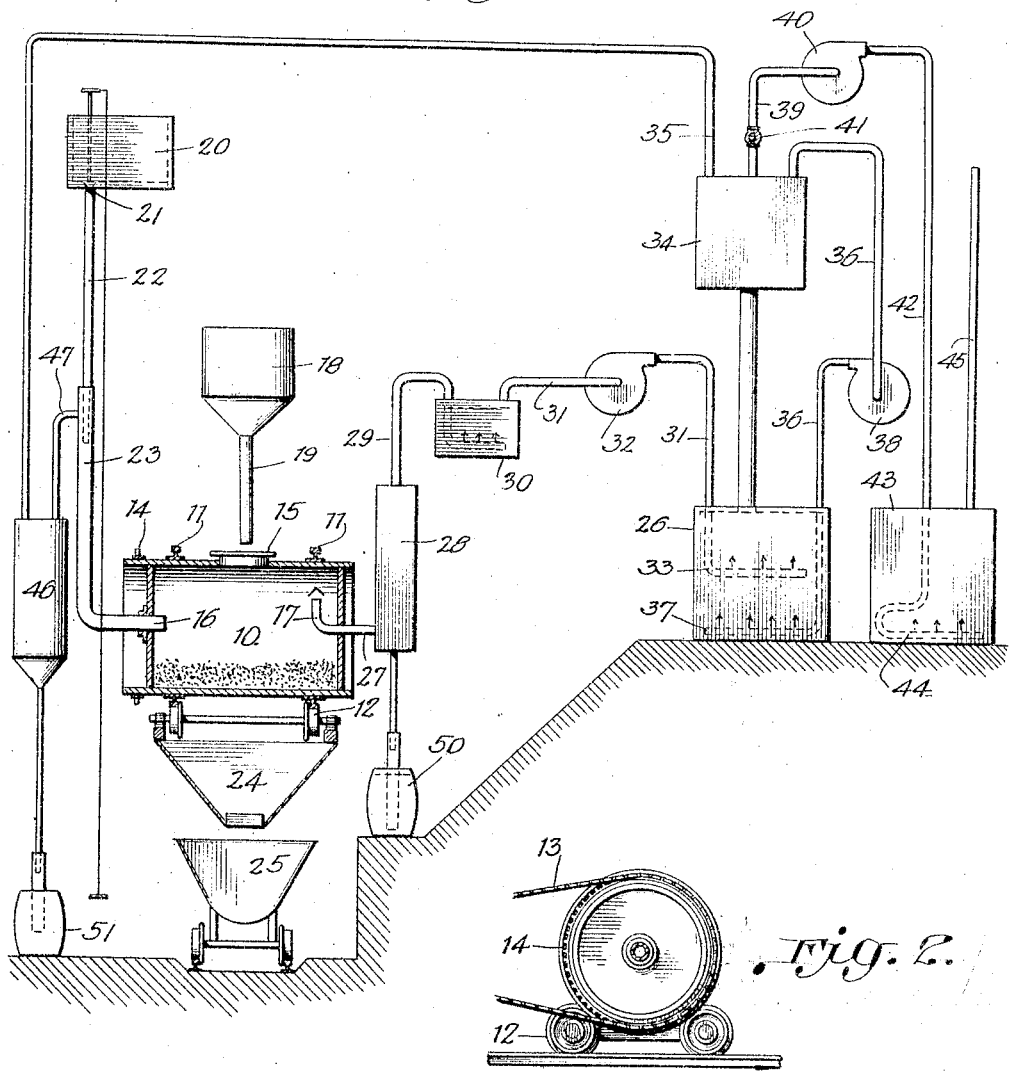

HERBERT R. HANLEY, OF KENNETT, CALIFORNIA.

METHOD OF GENERATING GASES AND TREATING SOLUTIONS THEREWITH.

1,360,524.   Specification of Letters Patent.   Patented Nov. 30, 1920.

Application filed April 15, 1919. Serial No. 290,214.

*To all whom it may concern:*

Be it known that I, HERBERT R. HANLEY, a citizen of the United States, residing at Kennett, in the county of Shasta and State of California, have invented or discovered certain new and useful Improvements in Methods of Generating Gases and Treating Solutions Therewith, of which the following is a specification, reference being had therein to the accompanying drawing.

This invention relates to the generation of gases, particularly hydrogen sulfid, and to the treatment of liquids or solutions with the gases so generated for purposes of purification or otherwise.

The invention has for its general objects the economic utilization and complete consumption without waste of the materials used in the generation of the gas, and of the gas itself; the convenient discharge of the products of the reaction; and the thorough and even treatment of the solution to be acted upon to the desired extent without local over-treatment or removal therefrom of substances not intended.

The foregoing and other objects of the invention, together with means whereby the same may be carried into effect, will best be understood from the following description of one form of apparatus embodying the invention and capable of operation in accordance with the method involved. It will be understood, however, that the particular constructions, arrangements, and operations referred to have been chosen for illustrative purposes merely, and that the invention, as defined by the claims hereunto appended, may be otherwise practised without departing from the spirit and scope thereof.

In said drawing:

Figure 1 is a diagrammatic view of an apparatus arranged in accordance with the invention.

Fig. 2 is an end elevation of the generating drum.

In the generation of certain gases by the action of an acid upon a solid reagent, for example, in the generation of hydrogen sulfid by the well known reaction between iron monosulfid bearing bodies and acids, it is found that, as the action proceeds, the rate of gas generation becomes gradually retarded due to the sealing over of the active solids by the inert products of the reaction, and that finally the generation ceases before either of the reagents has been completely consumed. It has also been found that the pressure developed by the gases as generated cannot be depended upon to force such gases through the solutions to be treated, particularly when the generating reaction becomes weak as the acid approaches neutralization, and that, indeed, in order to secure efficient gas generation, it is necessary to avoid any gas pressure whatever within the generator. The present invention accordingly contemplates the provision of an improved generator wherein the mass contained therein may be conveniently agitated in such a manner as to prevent the retardation of gas generation by the causes above referred to, said generator being also of such a construction that the residue remaining after the reaction is fully completed may be conveniently removed. The invention further contemplates the provision of means whereby a condition of partial vacuum may be maintained within the generator and whereby a circulation of air is established through the apparatus in such a manner as to cause the gas to be drawn from the generator as fast as it is formed and to pass through the solution to be treated irrespective of the absence of driving pressure behind it in the generator.

To these ends the generator as shown comprises a cylindrical vessel 10 preferably composed of wooden staves and lined with lead. The lead lining is preferably protected from abrasion by an inner wood covering. The outside wood staves are held together by the usual hoops or bands 11. In addition to the hoops, there are circular rails of suitable cross section fastened to the drum and constituting a circular track. The cylinder or drum 10 is mounted upon wheels 12 upon which the rails or hoops 11 rest, said rails or hoops constituting a circular track whereby said drum may be readily rotated upon said wheels, as by means of a sprocket chain 13 engaging a suitable toothed ring 14 carried by said drum adjacent one end. Said drum 10 is provided with an opening or manhole 15 normally closed by a suitable cover and through which the active solids are introduced and the inert residue discharged, with an axial inlet 16 for the acid or other active liquid, and with an axial outlet 17 for the gas generated. The active solids, in more or less broken or finely divided form, may be supplied from a hopper or receptacle 18 having a chute 19 adapted, when the drum 10 is in the position shown in Fig. 1 and the manhole cover removed, to discharge the desired quantity of said solids through said manhole into the interior of the drum. The acid or other active liquid may be stored in a tank 20 having a valve controlled outlet 21 from which leads a pipe 22 communicating with a second pipe 23 leading to the inlet 16. Beneath the wheels 12 is a hopper 24 adapted to direct material discharged from the drum 10 into a suitable receptacle or car 25, whereby said material may be disposed of in any desired way.

In operation, the necessary reagents having been supplied to the drum 10 from the receptacle 18 and tank 20, respectively, the manhole cover 15 is replaced and the reaction allowed to proceed in the usual manner, the gas generated passing out of the drum through the outlet 17. When the generation of gas begins to be retarded, due to the coating of the active solids with inert matter, the drum is rotated more or less to cause the solids to fall about therein, thereby causing the inert coatings to be removed by attrition, and new surfaces to be presented to the liquid reagent. As the reagents approach exhaustion the drum may be rotated constantly until the acid has been completely consumed or neutralized. Thereafter the cover 15 may be removed, the drum turned to bring the manhole lowermost, and the waste material thereby conveniently discharged through the hopper 24 into the car or other receptacle 25.

In accordance with the present invention, the acid used is of such dilution that it will not dissolve or combine with more of the metallic constituent of the active solid than, when combined with the acid radical to form the resultant neutral salt, will be retained in solution in the liquid present without crystallization. Taking, by way of example, the generation of hydrogen sulfid by the action of sulfuric acid upon iron sulfid, if the usual strong or relatively concentrated acid is used, say 300 grams of sulfuric acid per liter of liquid, this acid will be capable of dissolving or combining with 170 grams of iron per liter. The generator solution, however, can carry only 144 grams of iron per liter, which will enter into combination with only 252 grams of sulfuric acid per liter. The generator solution therefore carries an excess of 48 grams of sulfuric acid per liter at the time said solution is saturated with iron, which means that no further reaction will be possible unless the process is interrupted and water introduced to furnish sufficient liquid to dissolve the iron capable of combining with the remaining 48 grams of sulfuric acid. This will cause a waste of gas. In accordance with the present invention, however, the acid solution is introduced at such a strength, say, in the example above given, 200 grams of sulfuric acid per liter, that the amount of iron capable of combining therewith will be easily retained in the generator solution at neutrality. In other words, in accordance with the present process, the acid is diluted to such a proportion that the total quantity of liquid is sufficient to retain in solution the product of the reaction when the acid in the said liquid is completely consumed.

From the gas outlet 17 the gas is conveyed to the treating or precipitating tank or chamber 26 in which the solution to be purified or otherwise treated is placed. In the preferred arrangement shown the outlet 17 communicates with a pipe 27 leading to a separator 28 in which any moisture carried by the gas is removed and from which leads a pipe 29 by which the gas is conveyed to a washer 30 from which said gas passes through a pipe 31 to said treating tank or chamber 26. At some point in the system is provided a pump or suction device whereby a circulation of gas is established and a condition of partial vacuum maintained in the generating drum 10, said device, as herein shown, comprising a blower 32 in the piping 31. The pipe 31 communicates with the treating tank or chamber 26 at a point below the surface of the liquid therein, but, for reasons hereinafter explained, preferably above the bottom thereof, through a suitable perforated inlet member 33. Said tank or chamber 26, which is fitted with a closed top, has superimposed thereon a drum 34 communicating with the interior of the tank. The gas, after passing through the solution in the tank, enters the drum 34, carrying with it the froth or foam formed by the action of the gas on the solution, said froth or foam being separated from the attenuated gas in said drum, and the solid particles in suspension returning by gravity to the tank. Leading from the separating drum 34 is a pipe 35 through which a portion of the attenuated or partially spent gas is returned to the generating chamber or drum 10, where it is mixed with the freshly generated gas and again conveyed to the treating tank being thereby regenerated and rendered capable of further action upon the solution to be treated. The pipe 35 preferably leads to a separator 46 in which the gas is relieved of any moisture taken up during its passage through the precipitating tank 26 and separating drum 34, and from which said gas passes through a pipe 47 to the liquid inlet pipe 23 and thence to the drum 10 by way of the inlet 16. In this manner it will be seen that a closed circuit between the generating chamber and the treating chamber is provided, whereby the gas is used repeatedly in order to insure its complete exhaustion.

It has been observed that, when gas is introduced into a liquid, the greatest agitation of the liquid occurs a short distance above the level at which said gas is introduced, but since vigorous agitation is necessary to the efficient treatment of solutions with hydrogen sulfid, it is desirable that this agitation be made as great as possible immediately adjacent the gas inlet. To this end there is provided a second pipe 36 leading from the drum 34 to the bottom of the tank 26 where it communicates with a suitable perforated inlet member 37, said pipe 36 being provided with a blower or other circulating means 38, whereby a portion of the attenuated or partially spent gas in the drum is returned to the tank 26. The attenuated gas which thus enters the treating tank below the inlet 33 produces, at a short distance above the inlet 37, and consequently in the vicinity or zone of the inlet 33, a violent agitation. It will thus be seen that the richer gas from the inlet 33 enters the solution at a point where violent agitation of the same occurs, which disperses said richer gas through a very large volume of the solution, thereby insuring a relatively even treatment of the solution by the gas. This is highly desirable, particularly in the use of hydrogen sulfid as a purifying agent, since when said gas is introduced into the solution without additional agitation said solution is frequently locally overtreated. For example, hydrogen sulfid is frequently used for the purpose of removing arsenic, copper, cadmium and other impurities from the solutions of zinc sulfate. Overtreatment will result in the removal also of a greater or less amount of the zinc, which is objectionable but difficult to avoid in apparatus as heretofore arranged, and in which the gas is not thoroughly dispersed throughout the liquid, since treatment sufficient to remove all impurities from all parts of the mass will be greater than necessary in some parts. By reason of the thorough dispersion of the gas in the arrangement above described, said gas may be caused to remove the desired impurities without affecting the constituents to be retained.

In order to insure the maintenance of the desirable condition of partial vacuum within the system and prevent the pressure therein from rising above a predetermined maximum, due to inward air leakage or otherwise, means are preferably provided for automatically discharging from the system any excess pressure developed therein, said means being of such a character as fully to utilize the gas discharged so as to prevent wastage thereof. As herein shown a third pipe 39 is led from the separating drum 34, said pipe being provided with a blower or other circulating means 40 and with a relief or check valve 41 adapted, when the pressure in the system exceeds a predetermined maximum, to open and permit a portion of the attenuated gas in the separating drum 34 to be drawn through the pipe 39 by the blower 40. In order that the gas thus drawn through the pipe 39 may be completely utilized or exhausted, thereby also avoiding any danger or deleterious effect due to the discharge of even a highly attenuated gas into the atmosphere, said gas may be forced by the blower 40 through a pipe 42 to a secondary or auxiliary precipitating or treating tank or chamber 43, said gas entering said tank or chamber through a suitable inlet 44, and being discharged to the atmosphere through a suitable exhaust pipe 45.

As a further safeguard against the development of pressure in the generating chamber 10, due to accidental obstruction of the system at some point, or otherwise, the separators 28 and 46 are preferably provided with water seals 50 and 51 adapted to be blown off in the event of excess pressure, thereby venting said pressure to the atmosphere.

I do not herein claim the apparatus hereinbefore described, as the same is claimed in my application Serial No. 337,676, filed November 13, 1919, which is a division of this application.

Having thus described my invention I claim and desire to secure by Letters Patent:

1. The herein described method of treating liquid with gas, which consists in introducing the gas into the liquid at a given level, collecting the partially spent gas above the surface of said liquid, and again introducing the same into said liquid at a level beneath said first-named level.

2. The herein described method of treating liquid with gas, which consists in introducing the gas into the liquid at a given level, separating the resultant froth from the partially spent gas, and again introducing said partially spent gas into said liquid at a level beneath said first named level.

3. The herein described method of generating gases and treating solutions therewith, which consists in bringing together in a generating chamber and under the required conditions the necessary materials to bring about the gas generating reaction, passing the resultant gas through the solution to be treated in a treating chamber, and thereafter returning the partially spent gas to said generating chamber and mixing the same with fresh gas for further use.

4. The herein described method of generating gases by the action of an acid upon a reagent and treating solutions with the gas so generated, which consists in diluting the acid to such a proportion that the quantity of liquid is sufficient to retain in solution the product of the reaction when the acid in said liquid is completely consumed, treating said reagent with said liquid in a generating chamber, passing the resultant gas through the solution to be treated in a treating chamber, and returning the partially spent gas to said generating chamber.

5. The herein described method of generating gases and treating solutions therewith, which consists in bringing together in a generating chamber and under a condition of partial vacuum the necessary materials to bring about the gas generating reaction, passing the resultant gas through the solution to be treated, and thereafter returning the partially spent gas to said generating chamber and mixing the same with fresh gas for further use.

6. The herein described method of generating gases and treating solutions therewith, which consists in bringing together in a generating chamber the necessary materials to bring about the gas generating reaction, maintaining a condition of partial vacuum in said chamber, passing the resultant gas through the solution to be treated, and causing the partially spent gas to return to said generating chamber under the influence of said partial vacuum.

7. The herein described method of generating gases and treating solutions therewith, which consists in bringing together in a generating chamber the necessary materials to bring about the gas generating reaction, applying suction to said chamber to draw the resultant gas therefrom and forcing said gas through the solution to be treated in a treating chamber, thereby maintaining conditions of relatively low and high pressures in said generating and treating chambers, and causing the partially spent gas, under the influence of said differences in pressure, to return to said generating chamber.

8. The herein described method of generating gases and treating solutions therewith, which consists in bringing together in a generating chamber the necessary materials to bring about the gas generating reaction, passing the resultant gas through the solution to be treated, and thereafter returning a portion of the partially spent gas to said generating chamber and mixing the same with fresh gas for further use.

9. The herein described method of generating gases and treating solutions therewith, which consists in bringing together in a generating chamber the necessary materials to bring about the gas generating reaction, passing the resultant gas through the solution to be treated, returning a portion of the partially spent gas to said generating chamber and mixing the same with fresh gas for further use and again introducing the remaining portion of said spent gas into said solution.

10. The herein described method of generating gases and treating liquids therewith, which consists in bringing together in a generating chamber the necessary materials to bring about the gas generating reaction, introducing the gas so generated into the liquid in a treating chamber at a level above the bottom thereof, collecting the partially spent gas above the surface of said liquid, returning a portion of the gas so collected to said generating chamber, and again introducing another portion of said gas into said liquid at a level beneath said first named level.

In testimony whereof I affix my signature.

HERBERT R. HANLEY.